A. A. PAULY.
MOLDING APPARATUS.
APPLICATION FILED MAY 19, 1910. RENEWED JAN. 11, 1912.

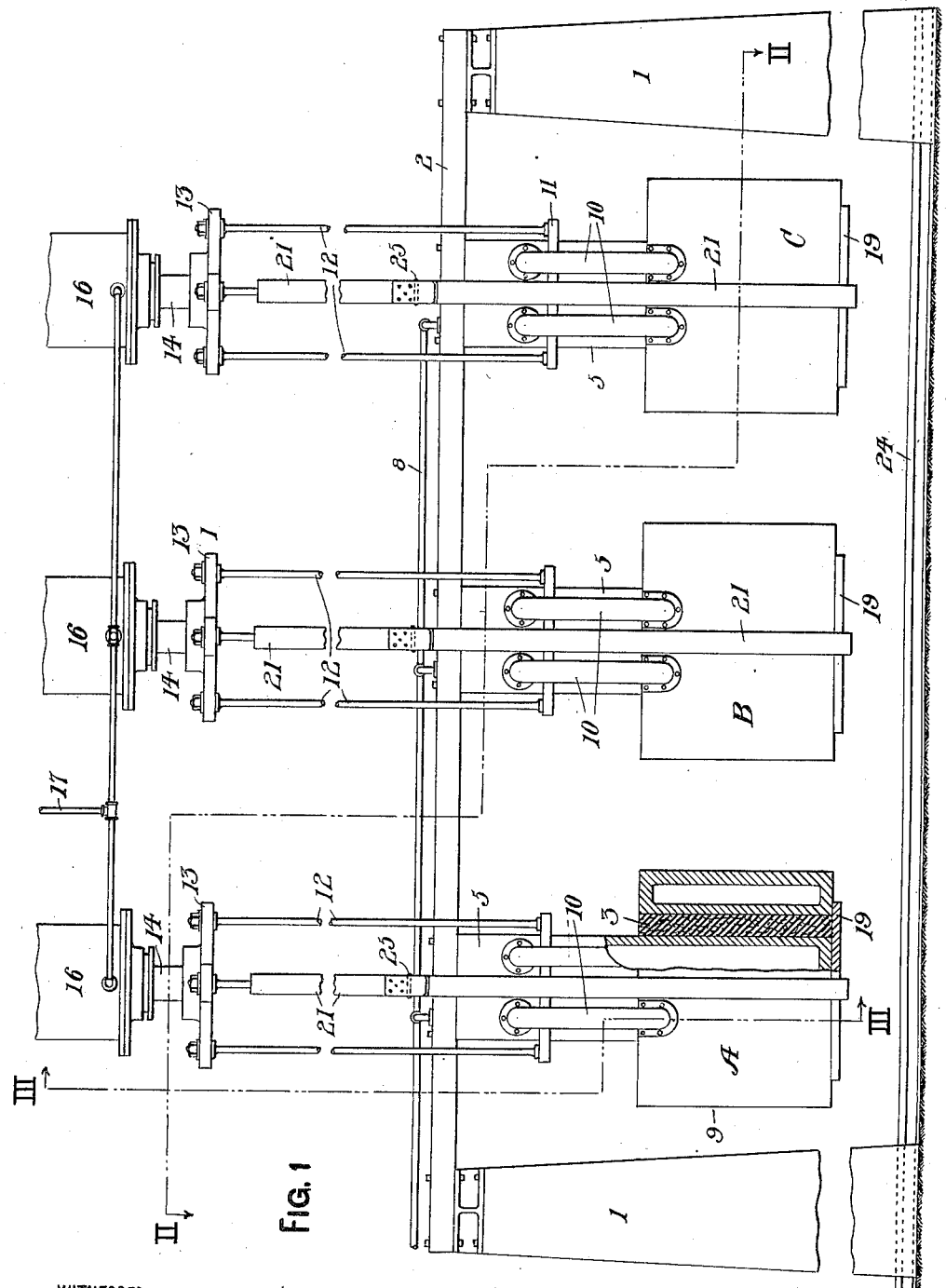

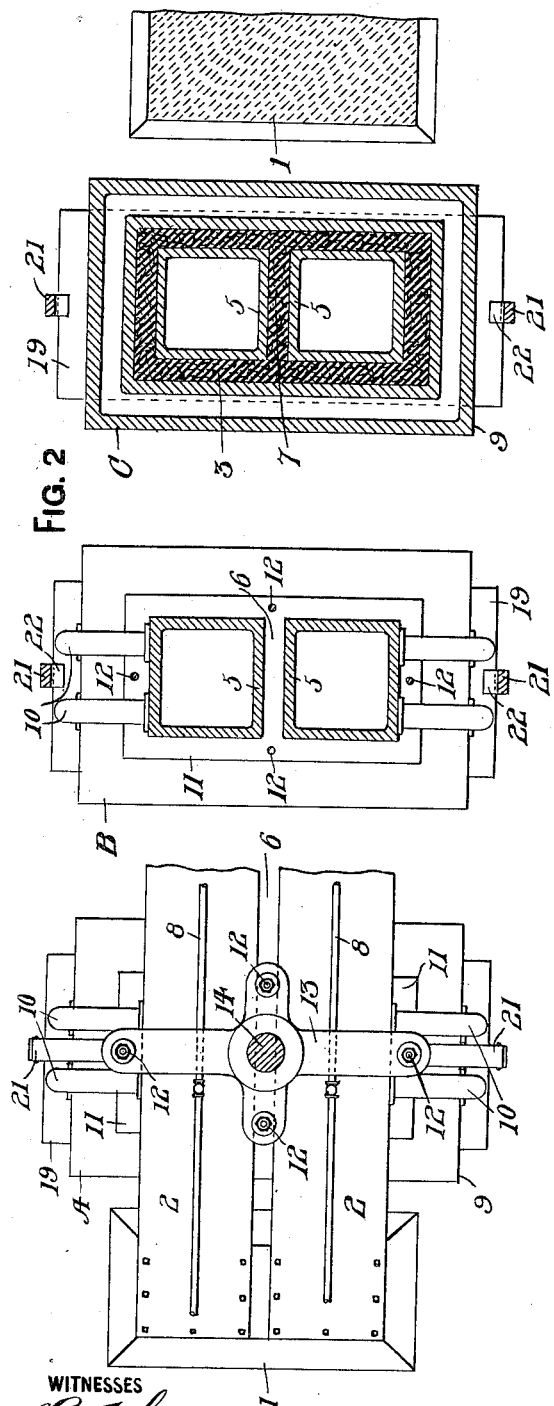

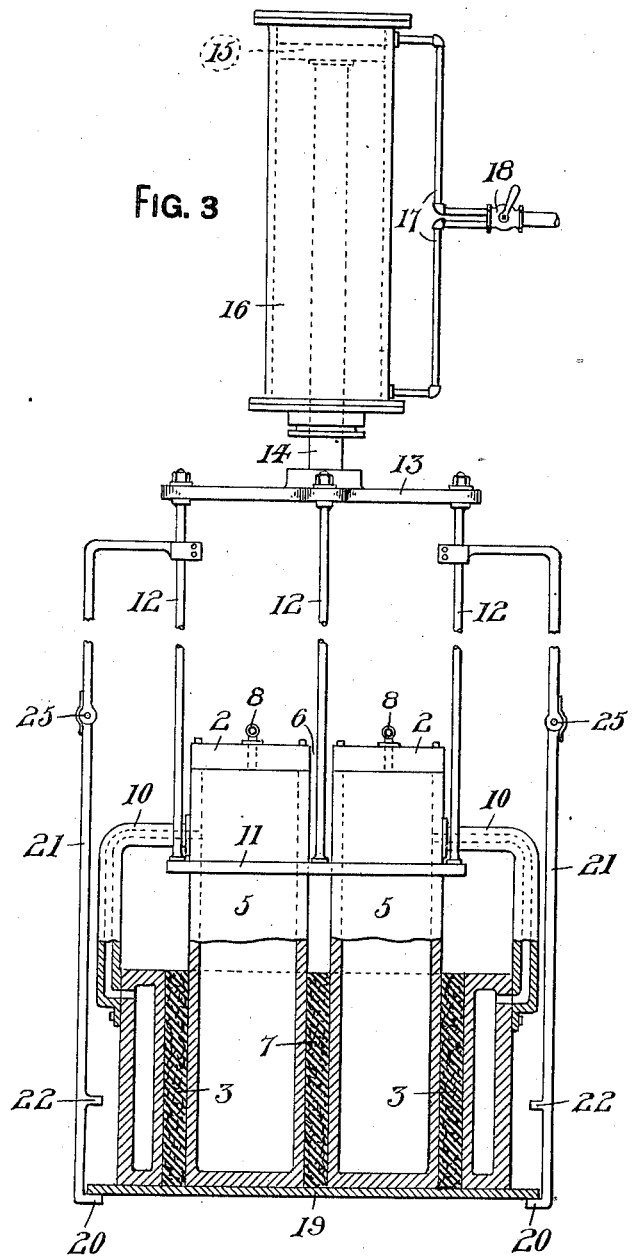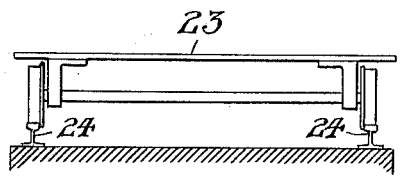

1,029,561.

Patented June 11, 1912.
4 SHEETS—SHEET 4.

WITNESSES
INVENTOR

UNITED STATES PATENT OFFICE.

ALBERT A. PAULY, OF YOUNGSTOWN, OHIO.

MOLDING APPARATUS.

1,029,561. Specification of Letters Patent. Patented June 11, 1912.

Application filed May 19, 1910, Serial No. 562,222. Renewed January 11, 1912. Serial No. 670,726.

*To all whom it may concern:*

Be it known that I, ALBERT A. PAULY, a citizen of the United States, residing at Youngstown, in the county of Mahoning and State of Ohio, have invented new and useful Improvements in Molding Apparatus, of which the following is a specification.

My invention relates to molding apparatus and has for its object to facilitate and cheapen the manufacture of cementitious articles.

The drawings show my invention applied to the manufacture of hollow cement building blocks.

I show the molding apparatus constructed to eject the articles downwardly upon a car, on which they may be transferred to a drying or curing oven without handling. I do not restrict the application of my invention to the precise construction shown and described.

Figure 4:
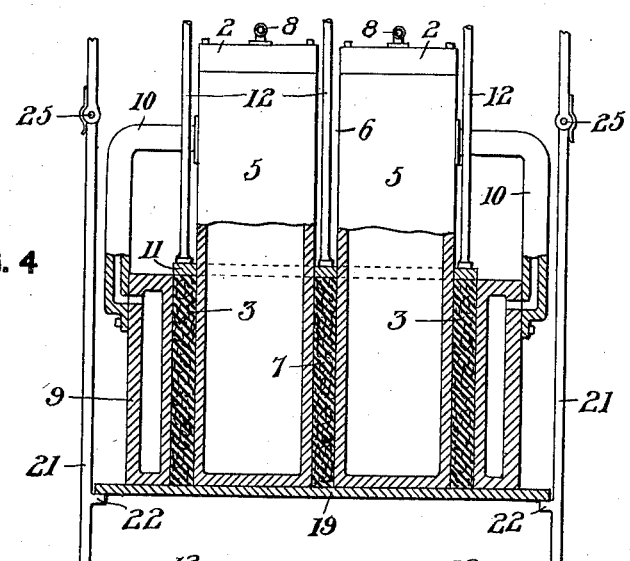
Figure 5:
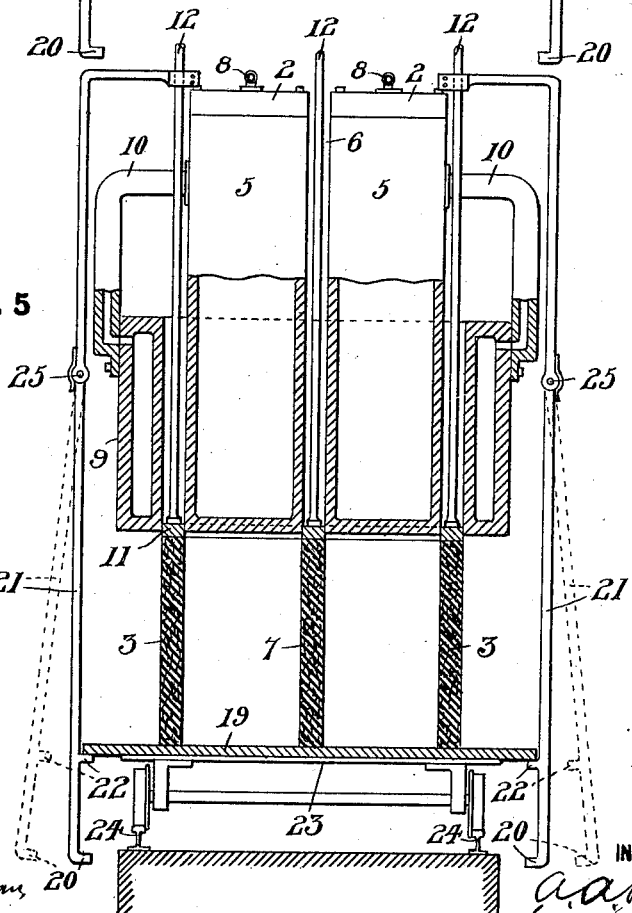

Referring to the accompanying drawings, Figure 1 is a side elevation of a molding apparatus constructed in accordance with the principles of my invention, a portion of the left-hand mold having been broken away; Fig. 2, a section of Fig. 1 on the line II—II; Fig. 3, a section of Fig. 1 on the line III—III; Fig. 4, a section, partly in elevation, showing the parts arranged to begin the ejection of a cement block; Fig. 5, a view similar to Fig. 4, but showing the parts as they are when the block has been entirely ejected; Fig. 6, a perspective of the lower end of the ejecting device or pusher; and Fig. 7, a perspective of a finished block resting on a temporary mold bottom, on which the block may remain till it is cured.

On the drawings, I show the two vertical columns or supports 1, on which the ends of the two horizontal parallel spaced beams 2 are secured. I have shown three vertical molds, A, B, and C, each with its accessory parts supported by these beams. The molds are constructed to make building blocks, as shown on Fig. 7, in which 3 is the building block having the two openings 4 therein.

The openings 4 are formed by two vertical cores 5 which are arranged side by side transversely of the beams and are secured to the beams so as to be suspended therefrom, one core at each side of the space 6 between the beams. The cores are spaced apart to correspond to the thickness of the partition 7 of the block 3. The cores are hollow and may be supplied with steam or hot water from the supply pipes 8 having branches leading to each core in the molds A, B, and C.

The cores for each mold are surrounded by the hollow vertical mold-body 9, being spaced from the cores by the thickness of the exterior walls of the block 3. The cores are longer than the molds which are supported so as to have their lower ends flush with the lower ends of the cores. The mold-bodies may be suspended in any desired manner. I have shown each mold-body connected to and supported by the cores by means of the pipes 10 which connect the hollows of the cores and the mold-body, so that the mold-body may receive heating fluids at the same time and from the same source as the cores. It is clear that steam may be supplied to the mold-bodies in various other ways.

11 is a horizontal ejector or pusher having the shape and dimensions of the cross-section of the block 3, so that it may engage the top of the block and push it down through the mold-body. The ejector is supported by the vertical rods 12, whose upper ends are attached to the cross-head 13 above the beams 2. The cross-head is connected to the piston-rod 14 connected to the piston 15, working in the cylinder 16, motor fluid, as steam, being admitted to either end of the cylinder through the pipes 17 by means of the valve 18 of usual construction.

The molding space between the cores and the mold-body has its upper end open through which the said space may be filled with cement or the like, and its lower end closed during the molding operation by the bottom-plate 19, which is held up against the bottoms of the cores and mold-body by the lower hooks or lugs 20 at the lower end of the rods 21 connected to the rods 12 near the cross-head 13. The rods 21 have also the hooks or lugs 22 located as far above the hooks 20 as the ejector 11 is above the top of the molded article or mold-body.

23 is a car or truck constructed to run on the rails 24 beneath the molds, the car being somewhat narrower than the width of the plates 19, so that the rods 21 may pass at opposite sides of the car. The rods 21 are hinged at 25 so that their lower hooked ends may be swung away from the car, as shown in dotted lines, Fig. 5. The springs 26 tend to hold the rods 21 in the position shown in full lines.

The parts, being as in Fig. 3, in which the plate 19 is held against the bottom of the mold by the hooks 20 and the ejector 11 is above the mold-body 9, cement is poured into the top of the mold space, steam having been admitted to the hollow in the cores 5 and the body 9. The top of the block is smoothed preferably flush with the top of the mold-body. When the block has become sufficiently hardened so as to stand alone, this hardening being hastened by the heating of the mold, the valve 18 is operated to admit steam to the upper end of the cylinder 16, whereupon the ejector 11 and the plate 19 move downwardly, the block remaining in the mold by frictional engagement with the sides thereof. The operator cuts off the steam so that the parts will come to rest with the ejector resting on the top of the block 3, as shown on Fig. 4. The plate 19 or another plate is placed on the hooks or lugs 22, which are located so that the plate engages the lower end of the mold and the block 3. The valve is again moved so as to cause the pusher 11 and the plate 19 to move downwardly until the plate rests on the car 23 as shown in Fig. 5. As the ejector moves down the plate 19 supports the block, preventing its dropping from the mold to the car, which might destroy the block. Even if the block does not actually rest on the plate, owing to the adjustment of the pusher and the hooks 22 being faulty, the block could not fall far enough to injure it. The plate 19 with the block 3 being on the car the rods 21 are swung out as shown in dotted lines and the valve is operated to admit steam into the lower end of the cylinder, which causes the ejector and the hooks to be raised to their original position, shown in Figs 1 and 3. A new plate 19 is put on the hooks 20 and another block 3 is made in the manner described.

I have shown each of the molds A, B, and C provided with a cylinder 16, but it is clear that one cylinder could operate all the ejectors and hooks of the three molds. As the molds are in line one long plate could take the place of the three short plates 19. Thus, the action of the three molds would be simultaneous. It is also evident that hydraulic cylinders, screws, or other mechanical equivalents may be used in place of the steam cylinders 16.

I claim—

1. In a molding apparatus, a mold-support, a vertical hollow core suspended therefrom, a hollow vertical mold-body surrounding the lower end of the core, an ejector having travel above the mold-body to permit the mold to be filled and having travel between the core and mold body to eject the molded article, pipes connecting the hollows of the core and mold-body and supporting the latter, and means to supply a heated fluid to the said core and mold-body.

2. In a molding apparatus, a vertical mold-body, a plate to close the bottom of the same, an ejector normally above the mold-body and adapted to push the molded article downwardly, vertical supports connected to move simultaneously with said ejector, a pair of plate-engaging lugs on each support, the lower members of each pair arranged to support the plate during the molding action and the upper lugs arranged to receive a plate when the ejector begins its ejecting operation.

Signed at Youngstown, O., this 17" day of May, 1910.

ALBERT A. PAULY.

Witnesses:
H. G. BYE,
O. EVANS.

---

Copies of this patent may be obtained for five cents each, by addressing the "Commissioner of Patents, Washington, D. C."